(12) United States Patent
Tossavainen

(10) Patent No.: US 11,744,193 B2
(45) Date of Patent: Sep. 5, 2023

(54) ENERGY WOOD GRAPPLE AND A METHOD FOR ASSEMBLING AN ENERGY WOOD GRAPPLE

(71) Applicant: KX-TREESHEARS OY, Suolahti (FI)

(72) Inventor: Kimmo Tossavainen, Suolahti (FI)

(73) Assignee: KX-TREESHEARS OY, Suolahti (FI)

( * ) Notice: Subject to any disclaimer, the term of this patent is extended or adjusted under 35 U.S.C. 154(b) by 0 days.

(21) Appl. No.: 17/995,311

(22) PCT Filed: Mar. 26, 2021

(86) PCT No.: PCT/FI2021/050213
§ 371 (c)(1),
(2) Date: Oct. 3, 2022

(87) PCT Pub. No.: WO2021/205062
PCT Pub. Date: Oct. 14, 2021

(65) Prior Publication Data
US 2023/0121311 A1  Apr. 20, 2023

(30) Foreign Application Priority Data

Apr. 6, 2020 (FI) ..................... 20205364

(51) Int. Cl.
*A01G 23/081* (2006.01)
*A01G 23/087* (2006.01)

(52) U.S. Cl.
CPC ......... *A01G 23/081* (2013.01); *A01G 23/087* (2013.01)

(58) Field of Classification Search
CPC .... A01G 23/08; A01G 23/087; A01G 23/091; A01G 23/093
See application file for complete search history.

(56) References Cited

U.S. PATENT DOCUMENTS

| 3,785,415 | A | * | 1/1974 | Taponen | .............. | A01G 23/087 144/34.1 |
| 6,418,989 | B1 | * | 7/2002 | Jarman | .................. | A01G 23/08 144/34.1 |
| 10,314,241 | B1 | | 6/2019 | Dunn | | |
| 2022/0304259 | A1 | * | 9/2022 | Steininger | ............ | B25J 15/0028 |

FOREIGN PATENT DOCUMENTS

| CA | 2590788 A1 | 12/2008 |
|---|---|---|
| EP | 2628384 A1 | 8/2013 |
| EP | 3085224 A1 | 10/2016 |
| EP | 3586608 A1 | 1/2020 |
| EP | 3613277 A1 | 2/2020 |
| FI | 771399 A | 11/1977 |
| FI | 105883 B | 10/2000 |
| FI | 121108 B | 7/2010 |
| FI | 123357 B1 * | 3/2013 |
| WO | 2010103189 A2 | 9/2010 |

* cited by examiner

Primary Examiner — Matthew Katcoff

(57) ABSTRACT

A modular structure for an energy wood grapple has at least two opposite jaws (31, 32) that are configured to press vertical trees against a blade, thereby cutting the tree. The remaining portion is held by the jaws (31, 32) against a body (10) of the energy wood grapple. The modular structure comprises two frame plates at opposite sides of the body (10), attached detachably, for example by bolts (23). The jaws (31, 32) are attached between the opposite frame plates detachably, to axles that provide a pivot for the jaws (31, 32).

10 Claims, 5 Drawing Sheets

ENERGY WOOD GRAPPLE AND A METHOD FOR ASSEMBLING AN ENERGY WOOD GRAPPLE

BACKGROUND

An energy wood grapple is used to fall and collect standing trees, cut branches off the tree or cut standing bushes of energy wood, such as willow. The grapple may be attached to a boom of a working machine, such as an excavator, a forestry machine or any device suitable for harvesting and/or collecting trees. The grapple comprises jaws and a blade, wherein the tightening jaws push the tree against the blade and cuts the tree. The jaws hold the grip on the tree, while it may be lifted, by the boom, to a pile or to a truck platform.

Getting tree harvesting equipment to the forest may be difficult. Heavy equipment must travel through cumbersome terrain. The accessories such as the energy wood grapple are difficult to be serviced outside a workshop. The joints are often welded to ensure adequate strength. If the energy wood grapple malfunctions, working on site may be interrupted, until a spare energy wood grapple has been delivered to the site. The energy wood grapples are usually too heavy and large for spare units to be taken on site as a precaution. The forestry machines are rarely designed to carry large spare parts during the travel.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A modular structure for an energy wood grapple is disclosed hereinafter. The energy wood grapple has at least two opposite jaws that are configured to press vertical trees against a blade, thereby cutting the tree. The remaining portion is held by the jaws against a body of the energy wood grapple. The modular structure comprises two frame plates at opposite sides of the body, attached detachably, for example by bolts. The jaws are attached between the opposite frame plates detachably, to axles that provide a pivot for the jaws.

The modular structure comprises means for connecting various accessories or enables modifying the component selection of the energy wood grapple. For example, the blade may be interchangeable or the jaws may be chosen for particular application.

Threads in the body and/or the frame plates enable assembling the energy wood grapple on site, even in the forest. The energy wood grapple may be stored or transported while being disassembled. The components may be arranged into a flat package, thus saving space. This enables carrying spare parts or the whole disassembled spare energy wood grapple in a cargo compartment of the forestry machine. The grapple may be assembled using only flat spanner, as the modular structure does not require special tools. Repairs at the workshop are enabled by the modular structure as spare parts may be delivered to the workshop.

Many of the attendant features will be more readily appreciated as they become better understood by reference to the following detailed description considered in connection with the accompanying drawings. The embodiments described below are not limited to implementations which solve any or all the disadvantages of known energy wood grapples.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in an energy wood grapple with the forestry machine, they are provided as an example and not a limitation. As those skilled in the art will appreciate, the present examples are suitable for application in a variety of heavy duty machinery.

Figure 1:
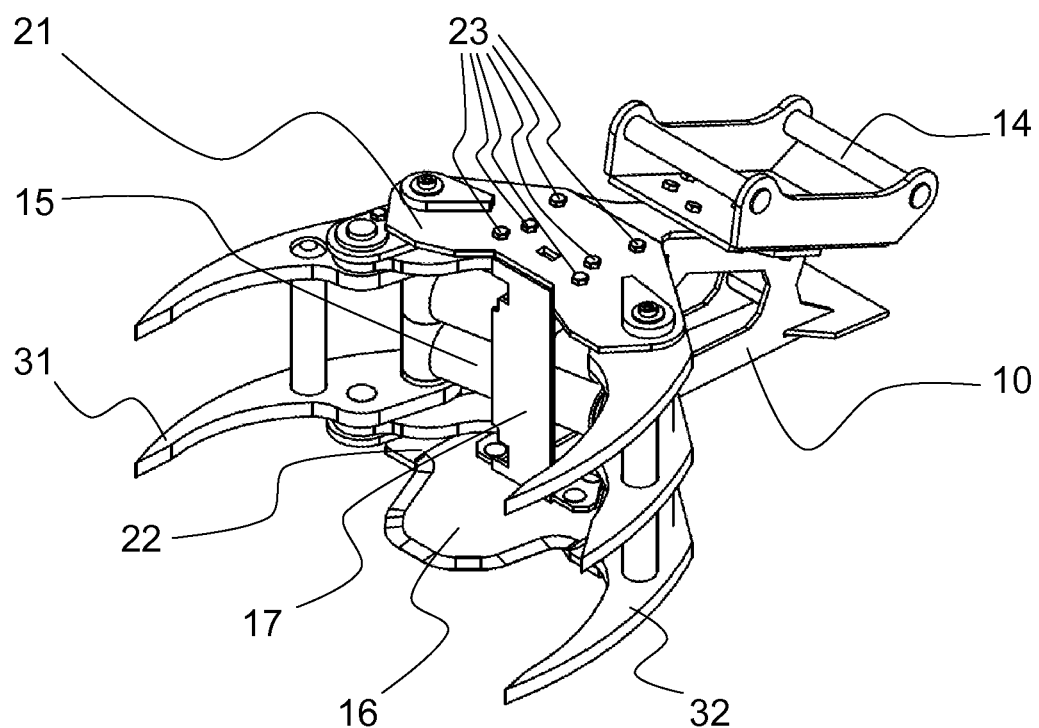
FIG. 1 illustrates schematically an isometric view of one exemplary embodiment for the energy wood grapple.
Figure 2:
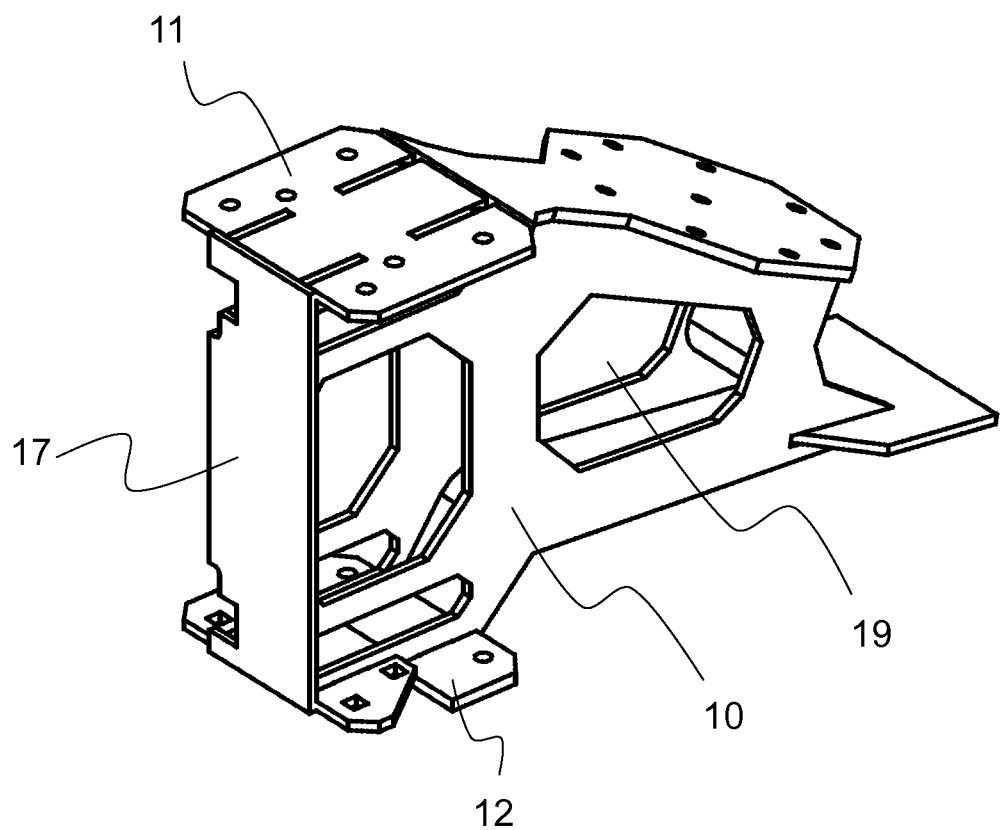
FIG. 2 illustrates schematically an isometric view of a body of the energy wood grapple.

FIG. 1 illustrates schematically an isometric view of one exemplary embodiment for the energy wood grapple. The energy wood grapple is assembled around a body 10, illustrated in FIG. 2. In one embodiment the body 10 is a fixed component, for example assembled by welding together metal plates. In one embodiment the body 10 is a box frame having multiple detachable plates. The box frame may be assembled by bolting or riveting metal plates together. The body 10 provides a platform for attaching multiple components to the energy wood grapple. The body 10 provides a platform for modular structure. The body 10 comprises a first side 11 for components to be attached. Opposite to the first side 11 is a second side 12 for components to be attached. At the back side of the body 10 are means 14 for fastening the energy wood grapple to the working machine, for example to a boom of a forestry machine, an excavator or a tractor.

Figure 3:
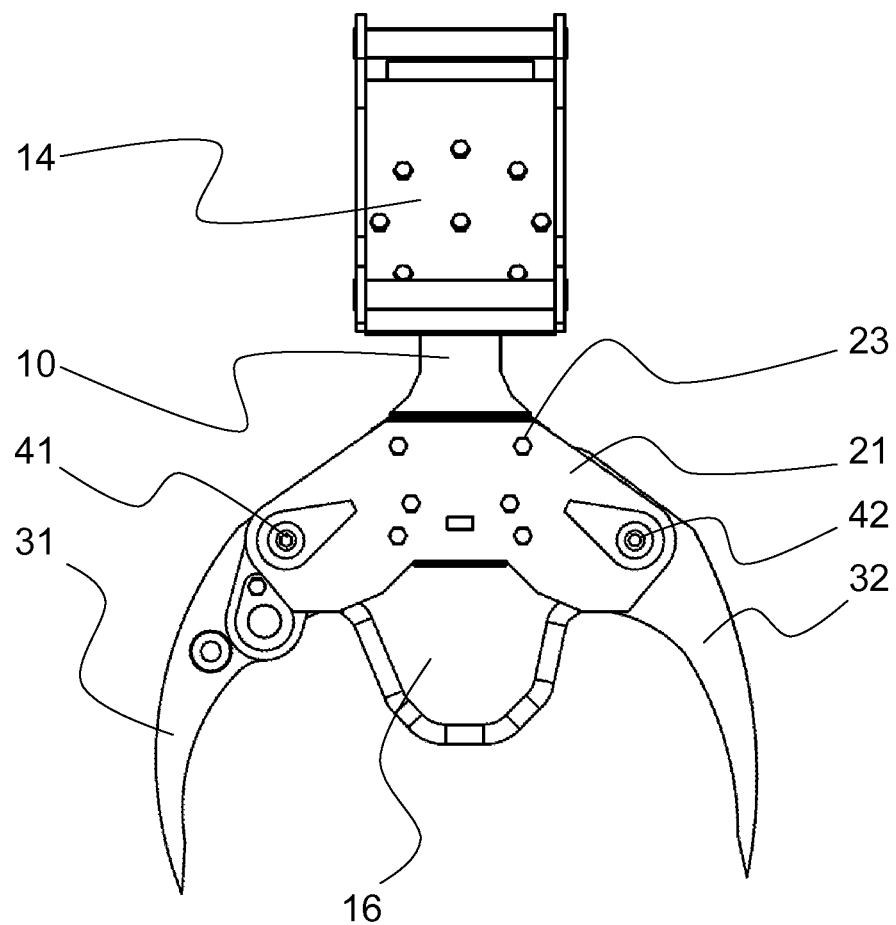
FIG. 3 illustrates schematically view from the first side to the energy wood grapple.

FIG. 3 illustrates schematically a view of the energy wood grapple from a first side 11. A first frame plate 21 is detachably connected to the first side 11 of the body 10. A second frame plate 22 is detachably connected to a second side 12 of the body 10, opposite to the first frame plate 21. In one embodiment the first frame plate 21 and/or the second frame plate 22 are detachably connected to the body by at least one bolt 23. The connection may comprise multiple bolts, as in the present example the first frame plate 21 is connected to the body 10 by six bolts 23. The at least one bolt 23 is configured to pass through the body 10 and the frame plate 21, 22 and tighten the connection. Other detachable means for connecting the components may be used. In one embodiment, the means for connecting is a rivet that tightens the elements together. When disassembling the riveted connection, the rivets may be drilled out.

Figure 4:
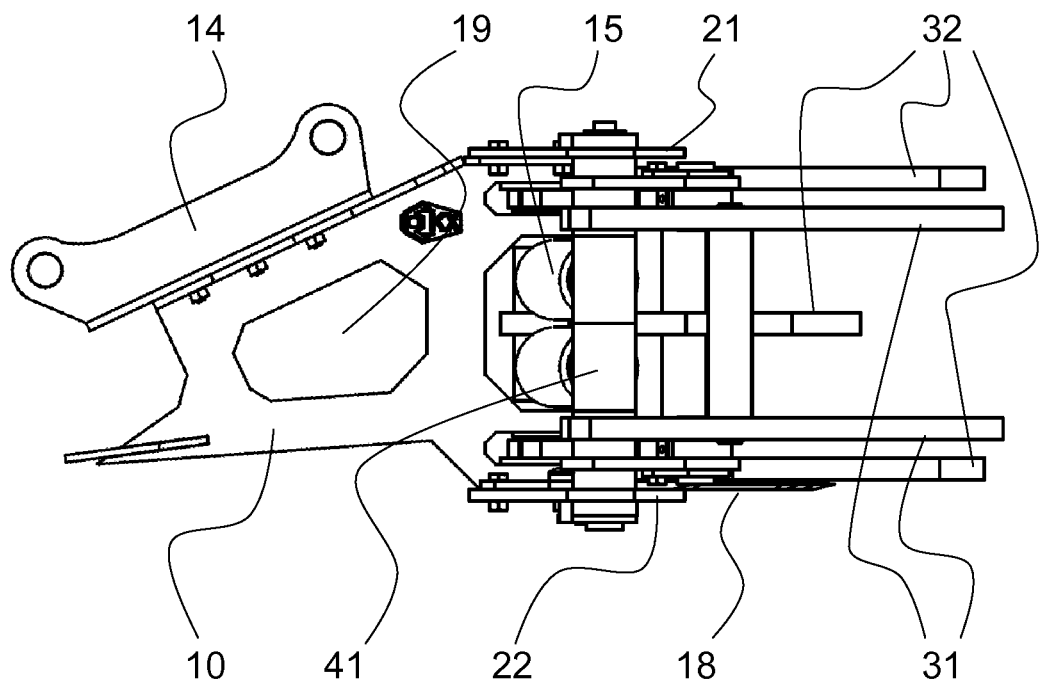
FIG. 4 illustrates schematically view from the third side to the energy wood grapple.

FIG. 4 illustrates schematically the energy wood grapple from a third side. The first frame plate 21 and the second frame plate 22 provide lateral extensions to the body 10, providing further basis for the modular structure. The first frame plate 21 and the second frame plate 22 are parallel in the present embodiment. A first jaw 31 is pivotally connected to the third side of the body 10, between the first frame plate 21 and the second frame plate 22. The first jaw 31 pivots around a first axle 41, that is detachably connected to the first frame plate 21 and the second frame plate 22. A second jaw 32 is pivotally connected to a fourth side of the body 10, opposite to the first jaw 31. The second jaw 32 is connected between the first frame plate 21 and the second frame plate 22. The second jaw 32 pivots around a second axle 42, that is detachably connected to the first frame plate 21 and the second frame plate 22. The first axle 41 and the second axle 42 are transversely to the first frame plate 21 and the second frame plate 22. The first axle 41 and the second axle 42 provide distance between the first frame plate 21 and the second frame plate 22, supporting the wings, i.e. the portions laterally extending the body 10.

The first jaw 31 and the second jaw 32 are configured to reciprocate between an open position and a closed position and moved by an actuator 15. In the open position the first jaw 31 and the second jaw 32 are configured to be positioned around a tree trunk. The energy wood grapple comprises means for cutting energy wood. In one embodiment the means for cutting energy wood is a blade 16. When the first jaw 31 and the second jaw 32 move towards the closed position, the wood between the jaws 31, 32 is pushed against the blade 16. The blade 16 passes through the energy wood, eventually cutting it. The remaining portion of the energy wood is pushed against the body 10 when the first jaw 31 and the second jaw 32 approach the closed position. The closed position is defined by the position when the energy wood is held in place by the first jaw 31 and the second jaw 32, with adequate force to allow lifting and/or moving the energy wood by the boom. The energy wood may be standing trees, multiple trees, a bush, a branch separated from a standing tree or any other form of wood or plant suitable to be used for producing energy by burning. The boom may turn or manipulate the energy wood grapple to various positions. The boom may comprise a power outlet for operating the first jaw 31 and the second jaw 32. Further controls for the boom and the energy wood grapple may be arranged at the forestry machine.

Figure 5:
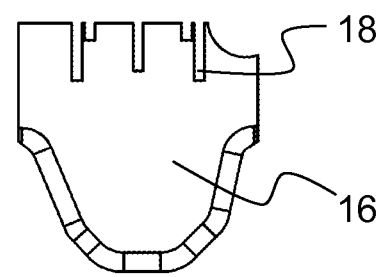
FIG. 5 illustrates schematically one exemplary embodiment of a blade.

FIG. 5 illustrates one exemplary embodiment of the blade 16. In one embodiment the blade 16 is removably connected to the body 10, transversely to the first jaw 31 and to the second jaw 32. In one embodiment, the blade 16 is positioned between the body 10 and the first frame plate 21 and the blade 16 is connected to the body 10 with the same at least one bolt 23 as the first frame plate 21. In the present example, the blade 16 is connected to the second side 12 of the body 10, between the body 10 and the second frame plate 22. The blade 16 comprises a groove 18 for interchanging the blade 18 without removing the bolts 23 that secure the second frame plate 22 to the body 10. The bolts 23 may be loosened, which allows the blade 16 to be slid out from the compression between the body 10 and the second frame plate 22. The arrangement enables changing the blade 16 without having loose items such as bolts 23 in the forest, when the blade 16 switch is performed on site.

In one embodiment the body 10 comprises a support plate 17 facing the first jaw 31 and the second jaw 32. The support plate 17 is configured to support the energy wood when the first jaw 31 and the second jaw 32 are in closed position. In one embodiment the actuator 15 is connected between the first jaw 31 and the second jaw 32. In one embodiment the body 10 comprises an opening 19 allowing the actuator 15 to reciprocate through the body 10. The support plate 17 provides protection for the actuator 15. The actuator 15 may be a hydraulic actuator or an electric actuator. In one embodiment, as in the present example, the energy wood grapple comprises multiple actuators 15 that are configured to operate simultaneously.

Figure 6:
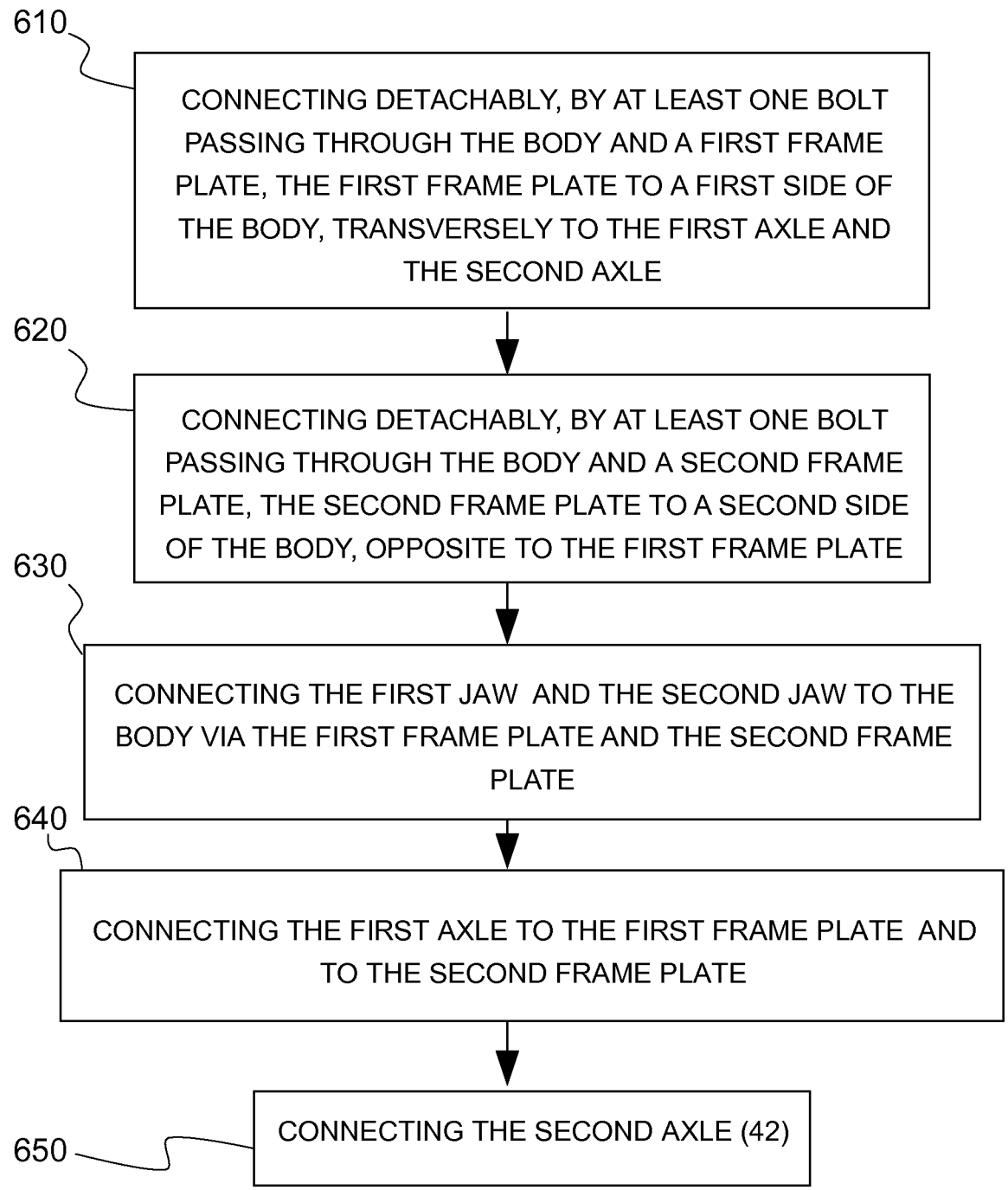
FIG. 6 is a flowchart illustrating steps of a method for assembling the energy wood grapple.

FIG. 6 illustrates a flowchart having the steps of a method for assembling the energy wood grapple. In step 610 the method comprises connecting detachably; by at least one bolt 23 passing through the body 10 and a first frame plate 21; the first frame plate 21 to a first side 11 of the body 21, transversely to the first axle 41 and the second axle 42. In step 620 the method comprises connecting detachably; by at least one bolt 23 passing through the body 10 and a second frame plate 22; the second frame plate to a second side of the body, opposite to the first frame plate. Step 630 comprises connecting the first jaw 31 and the second jaw 32 to the body 10 via the first frame plate 21 and the second frame plate 22. Step 640 comprises connecting the first axle 41 to the first frame plate 21 and to the second frame plate 22. Step 650 comprises connecting the second axle 42 to the first frame plate 21 and to the second frame plate 22.

An energy wood grapple is disclosed, comprising a body; a first jaw pivotally connected to a third side of the body by a first axle; a second jaw pivotally connected to a fourth side of the body by a second axle; and means for cutting energy wood. The first jaw and the second jaw are configured to reciprocate between an open position and a closed position and in the closed position push the energy wood against the body. A first frame plate is detachably connected to a first side of the body, transversely to the first axle and the second axle. A second frame plate is detachably connected to a second side of the body, opposite to the first frame plate. The first jaw and the second jaw are connected to the body via the first frame plate and the second frame plate, wherein the first axle is connected to the first frame plate and to the second frame plate; and the second axle is connected to the first frame plate and to the second frame plate. In one embodiment, the energy wood grapple comprises an actuator for moving the first jaw and the second jaw, connected between the first jaw and the second jaw; and the body comprises an opening allowing the actuator to reciprocate through the body. In one embodiment, the body comprises a support plate facing the jaws, configured to support the energy wood when the first jaw and the second jaw are in closed position. In one embodiment, the first frame plate is detachably connected to the body by at least one bolt passing through the body and the first frame plate. In one embodiment, the second frame plate is detachably connected to the body by at least one bolt passing through the body and the second frame plate. In one embodiment, the means for cutting energy wood is a blade removably connected to the body, transversely to the first jaw and the second jaw. In one embodiment, the blade is between the body and the first frame plate and the blade is connected to the body with the same at least one bolt as the first frame plate. In one embodiment, the body is a box frame having detachable plates.

Alternatively, or in addition, a method for assembling an energy wood grapple is disclosed. The energy wood grapple comprises a body; a first jaw pivotally connected to a third side of the body by a first axle; a second jaw pivotally connected to a fourth side of the body by a second axle; and means for cutting energy wood; wherein the first jaw and the second jaw are configured to reciprocate between an open position and a closed position and in the closed position push the energy wood against the body. The method comprises connecting detachably, by at least one bolt passing through the body and a first frame plate, the first frame plate to a first side of the body, transversely to the first axle and the second axle; connecting detachably, by at least one bolt passing through the body and a second frame plate, the second frame plate to a second side of the body, opposite to the first frame plate; connecting the first jaw and the second jaw to the body via the first frame plate and the second frame plate; connecting the first axle to the first frame plate and to the second frame plate; and connecting the second axle to the first frame plate and to the second frame plate. In one embodiment, the method comprises a step of connecting, between the first jaw and the second jaw, an actuator for moving the first jaw and the second jaw; and installing the actuator to reciprocate through an opening at the body. In one embodiment, the body comprises a support plate facing the jaws, configured to support the energy wood when the first jaw and the second jaw are in closed position. In one embodiment, the method comprises a step of connecting removably to the body, a blade as the means for cutting energy wood, transversely to the first jaw and the second jaw. In one embodiment, the method comprises a step of connecting the blade between the body and the first frame plate with the same at least one bolt as the first frame plate. In one embodiment, the body is a box frame comprising detachable plates.

Any range or device value given herein may be extended or altered without losing the effect sought.

Although at least a portion of the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An energy wood grapple, comprising:
   a body;
   a blade for cutting energy wood;
   wherein a first jaw and a second jaw are configured to reciprocate between an open position and a closed position and in the closed position push the energy wood against the body;
   the first jaw is pivotally connected to the body via a first frame plate and a first axle, and the second jaw is pivotally connected to the body via a second axle and a second frame plate,
   wherein the first axle is connected to the first frame plate and to the second frame plate; and
   the second axle is connected to the first frame plate and to the second frame plate;
   the blade for cutting energy wood is removably connected to the body, transversely to the first axle and the second axle;
   the blade is between the body and the second frame plate and at least one bolt connects the blade to the second frame plate and to the body; and
   the first frame plate is detachably connected to a first side of the body, transversely to the first axle and the second axle;
   the second frame plate is detachably connected to a second side of the body, opposite to the first frame plate.

2. An energy wood grapple according to claim 1, comprising an actuator for moving the first jaw and the second jaw, connected between the first jaw and the second jaw; and the body comprises an opening allowing the actuator to reciprocate through the body.

3. An energy wood grapple according to claim 2, wherein the body comprises a support plate facing the jaws, configured to support the energy wood when the first jaw and the second jaw are in closed position.

4. An energy wood grapple according to claim 1, wherein the first frame plate is detachably connected to the body by at least one other bolt passing through the body and the first frame plate.

5. An energy wood grapple according to claim 1, wherein the second frame plate is detachably connected to the body by the at least one bolt passing through the body and the second frame plate.

6. An energy wood grapple according to claim 1, wherein the body is a box frame having detachable plates.

7. A method for assembling an energy wood grapple, comprising:
   a body;
   a blade for cutting energy wood;
   wherein a first jaw and a second jaw are configured to reciprocate between an open position and a closed position and in the closed position push the energy wood against the body;
   connecting the first jaw pivotally to the body via a first frame plate and a first axle and the second jaw pivotally to the body via a second frame plate and a second axle to the body via the first frame plate and the second frame plate;

connecting the first axle to the first frame plate and to the second frame plate; and connecting the second axle to the first frame plate and to the second frame plate;

connecting removably to the body, the blade for cutting energy wood, transversely to the first jaw and the second jaw; connecting the blade between the body and the second frame plate and at least one bolt connects the blade to the second frame plate and to the body; and connecting detachably, by at least one other bolt passing through the body and the first frame plate, the first frame plate is connected to a first side of the body transversely to the first axle and the second axle;

connecting detachably, by the at least one bolt passing through the body and the second frame plate, the second frame plate is connected to a second side of the body, opposite to the first frame plate.

8. A method according to claim 7, comprising the steps of connecting, between the first jaw and the second jaw, an actuator for moving the first jaw and the second jaw; and installing the actuator to reciprocate through an opening at the body.

9. A method according to claim 8, wherein the body comprises a support plate facing the jaws, configured to support the energy wood when the first jaw and the second jaw are in closed position.

10. A method according to claim 7, wherein the body is a box frame comprising detachable plates.

\* \* \* \* \*